US008776339B2

(12) United States Patent
Betcher et al.

(10) Patent No.: US 8,776,339 B2
(45) Date of Patent: Jul. 15, 2014

(54) PULLER TOOL

(71) Applicant: Service Solutions U.S. LLC, Warren, MI (US)

(72) Inventors: Larry Betcher, Northfield, MN (US); Jacob Hanson, Owatonna, MN (US); Jose Barrios, Owatonna, MN (US); Robert Jensen, Clarks Grove, MN (US)

(73) Assignees: Bosch Automotive Service Solutions LLC, Warren, MI (US); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/919,374

(22) Filed: Jun. 17, 2013

(65) Prior Publication Data

US 2013/0283588 A1 Oct. 31, 2013

Related U.S. Application Data

(62) Division of application No. 12/633,241, filed on Dec. 8, 2009, now Pat. No. 8,464,411.

(51) Int. Cl.
*B23P 19/04* (2006.01)
*B66F 3/36* (2006.01)

(52) U.S. Cl.
USPC .............................................. 29/259; 254/100

(58) Field of Classification Search
USPC ............... 254/98, 100; 29/244–268; 269/164, 269/166, 6
See application file for complete search history.

(56) References Cited

U.S. PATENT DOCUMENTS

| | | | | |
|---|---|---|---|---|
| 50,941 | A | | 11/1865 | Macotter |
| 685,078 | A | | 10/1901 | Willringhaus |
| 1,064,400 | A | | 6/1913 | Timmins |
| 1,478,648 | A | | 9/1921 | Grahek |
| 1,402,477 | A | | 1/1922 | Wightman et al. |
| 1,426,835 | A | | 8/1922 | Mohrman |
| 1,431,378 | A | | 10/1922 | Derry |
| 1,629,003 | A | | 5/1924 | Schonfeld |
| 1,607,592 | A | | 11/1926 | Marciano et al. |
| 1,620,211 | A | | 3/1927 | Jerabek |
| 1,633,453 | A | * | 6/1927 | Miller ............................ 29/261 |
| 2,077,254 | A | | 4/1937 | Nestler |
| 2,468,970 | A | | 5/1949 | Gilbertson |
| 2,677,174 | A | | 5/1954 | Lee |
| 2,789,343 | A | | 4/1957 | Millsap |
| 2,821,776 | A | | 2/1958 | Keister |
| 2,821,777 | A | | 2/1958 | Keister |
| 2,865,585 | A | | 12/1958 | Beyer et al. |
| 3,103,740 | A | | 9/1963 | Crenshaw |
| 3,277,563 | A | | 10/1966 | Wilson |

(Continued)

OTHER PUBLICATIONS

Matco Tools Catalog—Brake Drum & Rotor Puller (2 Sheets); and 3 sheets of photos of the tool, Apr. 1, 2010.

*Primary Examiner* — Lee D Wilson
*Assistant Examiner* — Jamal Daniel
(74) *Attorney, Agent, or Firm* — Baker & Hostetler LLP

(57) ABSTRACT

A puller tool and method for pulling a component from another component are provided. The puller tool can include a cross bar, a pair of puller legs that are movable along the length of the cross bar and a forcing screw. The puller legs can be quickly positioned anywhere along the length of the cross bar through a quick release mechanism. The cross bar can include notches on its outer surface to ensure that the puller legs are equidistant from each other during use.

10 Claims, 2 Drawing Sheets

(56) References Cited

U.S. PATENT DOCUMENTS

| | | | |
|---|---|---|---|
| 3,372,457 | A | 3/1968 | Selby et al. |
| 3,402,455 | A | 9/1968 | Converse |
| 3,568,294 | A | 3/1971 | Conner |
| 3,689,978 | A | 9/1972 | Kelso |
| 3,908,258 | A | 9/1975 | Barty |
| 3,997,957 | A | 12/1976 | Tone et al. |
| 4,042,139 | A | 8/1977 | Pernsteiner et al. |
| 4,492,014 | A | 1/1985 | Alexander |
| 4,562,631 | A | 1/1986 | Welch |
| 4,761,869 | A | 8/1988 | Barry et al. |
| 4,893,395 | A | 1/1990 | Crowder |
| 4,908,925 | A | 3/1990 | Johnson |
| 4,989,311 | A | 2/1991 | Rosin |
| 5,005,449 | A | 4/1991 | Sorensen et al. |
| 5,174,023 | A | 12/1992 | Kilsdonk |
| 5,224,917 | A | 7/1993 | Kilsdonk |
| 5,247,727 | A | 9/1993 | Harris et al. |
| 5,351,380 | A | 10/1994 | Myers et al. |
| 5,408,732 | A | 4/1995 | Anfuso |
| 5,826,310 | A | 10/1998 | Hobday |
| 6,012,211 | A | 1/2000 | Ochoa et al. |
| 6,106,216 | A | 8/2000 | Hogan |
| 6,450,489 | B1 | 9/2002 | Wang |
| 6,609,283 | B1 | 8/2003 | Somerville |
| 6,925,696 | B1 | 8/2005 | Williams |
| 7,520,041 | B1 | 4/2009 | Aguilar |
| 7,653,975 | B2 | 2/2010 | Hu |
| 7,685,688 | B2 | 3/2010 | Fan |
| 7,770,277 | B2 | 8/2010 | Wridt |
| 7,909,314 | B2 | 3/2011 | Roesch et al. |
| 7,996,972 | B2 | 8/2011 | Hu |
| 2003/0037425 | A1 | 2/2003 | Sawaya |
| 2005/0177983 | A1 | 8/2005 | Holms |
| 2005/0177988 | A1 | 8/2005 | Williams |
| 2009/0194750 | A1 | 8/2009 | Fan |
| 2009/0236573 | A1 | 9/2009 | Hu |
| 2011/0179616 | A1 | 7/2011 | Oachs et al. |

* cited by examiner

PULLER TOOL

CROSS-REFERENCE TO RELATED APPLICATIONS

This application is a divisional of, and claims priority to, U.S. patent application Ser. No. 12/633,241, filed Dec. 8, 2009, the disclosure of which is incorporated by reference in its entirety.

FIELD OF THE INVENTION

The present invention relates generally to a puller. More particularly, the present invention relates to a puller tool for servicing a component such as a vehicle component.

BACKGROUND OF THE INVENTION

Automotive vehicles include components that will need to be replaced or serviced after a period of time. Such components include brake drums/rotors. Often the components can be difficult to remove because they rust or become corroded. The mechanic either breaks the drum off with a hammer or uses a universal puller that can not adapt well to the component being serviced. Thus, current servicing techniques can lead to vehicle damage, personal injury or significant time loss.

Accordingly, it is desirable to provide a tool that can easily remove the component being serviced by the user.

SUMMARY OF THE INVENTION

The foregoing needs are met, to a great extent, by the present invention, wherein in one aspect an apparatus is provided that in some embodiments include a puller that includes a quick adjustment mechanism to quickly adjust the puller jaws to the component being serviced.

In accordance with one embodiment of the present invention a puller is provided that can include a cross bar having a plurality of alignment notches on an outside surface, a pair of puller legs that receives the cross bar and includes a foot at a lower end to engage a component being serviced, a forcing screw received in a middle portion of the cross bar, the forcing screw having a rotational end and an engagement end, and a quick release mechanism coupled to the puller legs to position the puller legs along a length of the cross bar.

In accordance with another embodiment of the present invention, a puller tool is provided for servicing a component which can include a means for supporting having a plurality of alignment notches on an outside surface, a means for engaging that receives the means for supporting and includes a foot at a lower end to engage a component being serviced, a means for screwing received in a middle portion of the means for supporting, means for screwing having a rotational end and an engagement end, and a means for releasing coupled to the means for engaging to position the means for engaging along a length of the means for supporting.

In accordance with yet another embodiment of the present invention, a method of removing a component with a puller tool is provided and can include positioning a pair of puller legs along a cross bar of the puller tool with a quick release mechanism so that the puller legs are coupled to the component being serviced, turning a forcing screw in a first direction with a rotational tool until it contacts the component being serviced, and turning the forcing screw in the first direction to move the component being serviced.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
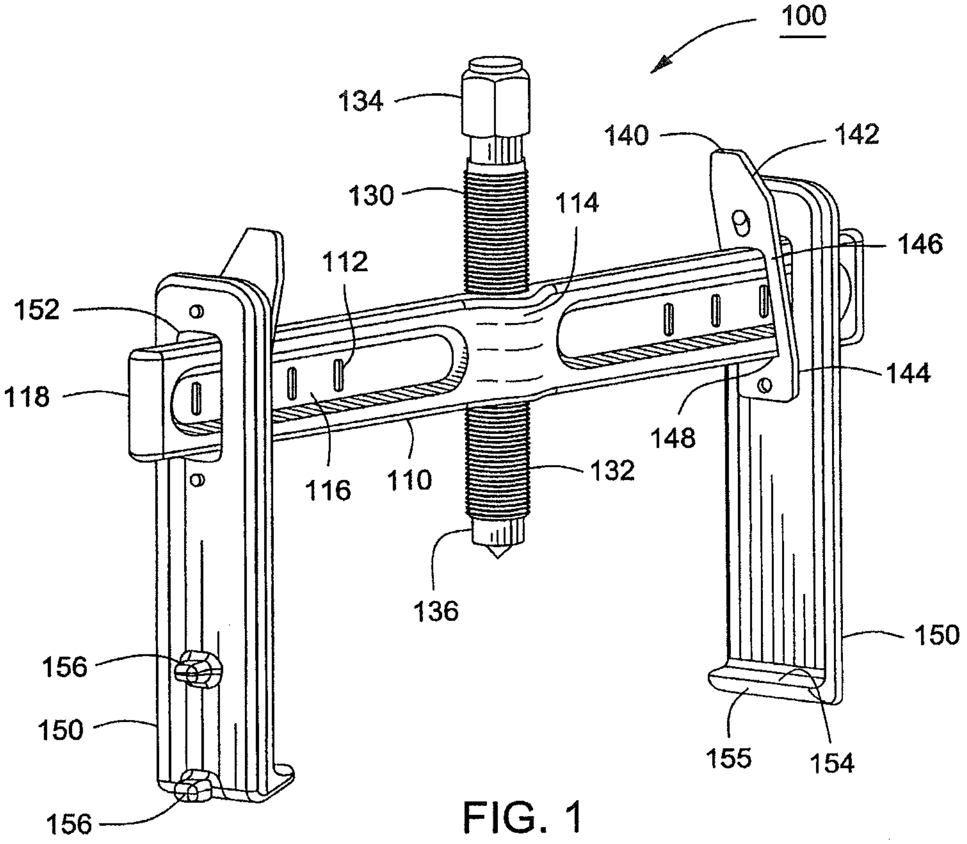
FIG. 1 illustrates a plan view of the automotive puller according to an embodiment of the invention.

The invention will now be described with reference to the drawing figures, in which like reference numerals refer to like parts throughout. An embodiment in accordance with the present invention provides a puller and method to components, such as vehicle components. The puller has a quick release mechanism to quickly position puller legs around the component being serviced. In one embodiment, the vehicle components can include sleeves, brake drum, pullers and other components.

FIG. 1 illustrates a plan view of the automotive puller 100 according to an embodiment of the invention. The puller 100 includes a cross bar 110, a forcing screw 130, and puller legs 150. The cross bar 110 is generally rectangular in shape, but can be other shapes such as oval or square. The ends 118 of the cross bar 110 can be rounded for aesthetic and safety reasons. The cross bar 110 can include marking notches 112 that can used to align a quick release mechanism 140 that is attached to the puller legs 150 (discussed below). The marking notches 112 are evenly spaced from a center portion 114 of the puller 100. Alternatively, the marking notches 112 can be evenly spaced from ends 118 of the puller 100. The user can align the puller legs 150 with the notches 112 so that the puller legs 150 can be evenly spaced from each other in a quick fashion and no offset occurs. In one embodiment, the marking notches can be positioned within a grooved portion 116 of the cross bar 110. In another embodiment, the marking notches 112 can be on the outer surface of the cross bar along its length.

In another embodiment, the top portion of the cross bar can include indentions or serrations. The notches can be used to position the puller legs along the cross bar. Similar to the marking notches 112, the indentions can be used to equally space (equidistant) the puller legs 150 during use.

In further embodiments, there can more than one cross bar, such as two, three, four or more cross bar 110. The cross bars can be placed in parallel to each other, x-shaped, in a cross configuration or another configurations desired by the user.

The forcing screw 130 can be positioned within the center portion 114 of the puller 100. The forcing screw 130 includes threads 132 on its outer surface. The threads 132 can mate with the threads (not shown) in the center portion 114. The forcing screw 130 may have one diameter or it may have several diameters of various sizes as shown in FIG. 1. The forcing screw 130 has a rotational end 134 which can mate with a rotational tool (not shown). The rotational tool can be a wrench, a plier, a powered tool or other types of tool that creates rotational movement of the forcing screw 130 in a desired direction. The rotational end 134 can be of various shapes in order to mate with the rotational tool, such as triangular, square, pentagon, hex, octagon and other shapes. The rotational tool can be used to rotate the forcing screw 130 in one direction to advance it or in a second direction to retreat it.

In another embodiment, the screw can be a hydraulic ram that includes a piston that can extended and retracted. In this embodiment, a rotational tool is not needed as hydraulics can be used to extend and retract the piston. The screw can be any type of device that can extend or retreat from the middle portion of the cross bar.

The forcing screw 130 includes an engagement end 136 to engage the vehicle component being worked on. The engagement end 136 can be flat or can include a tapered pointed end (as shown). The engagement end 136 can also be used to provide leverage to the puller 100 when in use. Thus, when the forcing screw is rotated, it will apply pressure to another component (wheel hub, for example) that is coupled to the component being pulled.

The puller legs 150 can be located anywhere along the cross bar 110. The puller legs include an opening 152 that can be sized and shaped to receive the cross bar 110. This allows the puller legs 150 to be positioned along the cross bar 110. The puller legs 150 can include a hooked feet 154 that is generally 90 degrees to an axis of the puller legs. However, the hooked feet 154 can be any angle desired by the user so that it can be mated with the component being serviced. The hooked feet 154 are designed to mate with the component that needs to be pulled, for example, so that when the forcing screw 130 is rotated, the component can be moved as desired with the assistant of the hooked feet 154. The hooked feet 154 can also include a radius or curved end 155. The curved end 155 can be curved any angle desired by the user.

The puller legs 150 can be any shape or size (length or width) as desired by the user and can be reversible to the position showed in FIG. 1. Thus, the hooked feet 154 may be positioned facing each other, away from each other or one towards and one away as desired by the user. Alternatively, the hooked feet may be placed on one side or both sides of the puller legs and along any length of the puller legs. In other embodiments, the hooked feet 154 can be jaws or teeth or other similar means. The puller legs 150 may also have screws, nails or similar attachments that can be attached to it or can include places that screws, nails or similar attachments can be attached or receive thereto. Alternatively, there can be three, four, five, six or more puller legs positioned on the cross bar. The number will be dependent on the needs of the user.

Retaining tabs 156 can be positioned a long an outside surface of the puller legs to receive various restraining means. A strap (FIG. 3) can be placed around the puller legs 150 to provide additional support to the puller legs and provide additional safety features. In other embodiments, the strap can be Velcro, metal band, leather band or other similar material. The retaining tabs 156 provide support and keep the straps in place during use. The retaining tabs 156 can protrude from the surface of the puller legs at any length desired. The retaining tabs may protrude at 90 degrees or angled at any angle desired by the user. Being angled will help keep the restraining means in place during use.

A quick release mechanism 140 (further discussed below) is also attached to a surface of the puller legs 150. In the embodiment shown in FIG. 1, the quick release mechanism 140 is on an inside surface of the puller legs 150, however, they can be placed on the outside or inside surface or both.

Figure 2:
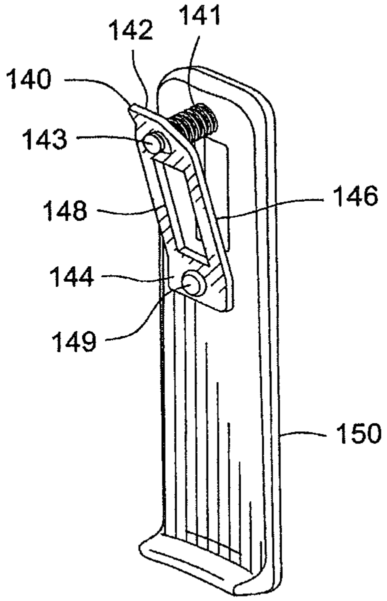
FIG. 2 illustrates the quick release mechanism of FIG. 1 on the puller leg.

FIG. 2 illustrates the quick release mechanism 140 of FIG. 1 on the puller leg 150. The quick release mechanism 140 is coupled to the puller legs 150 at two points. The first point is at first pin 143, which extends from the puller legs 150. The first pin 143 also includes a spring 141 that surrounds the first pin 143. The spring 141 is designed to bias the quick release mechanism 140 in an "engaged" position with the cross bar 110. In an alternative embodiment, the spring mechanism can be simply attached at one end to the puller legs and another end to the thumb tab portion. Other similar biasing device to a spring may also be used such as elastomeric devices, actuators, and the like.

The first pin's head is larger than the pin's body and thus can be used to retain a thumb tab 142 that is angled relative to a main portion 146. The angle of the thumb tab 142 makes it easier for the user to use their thumb to work the quick release mechanism 140. However, in another embodiment, the thumb tab 142 can be straight relative to the main portion 146. Further, the width of the thumb tab 142 is smaller than the width of the main portion 146. In other embodiments, the thumb tab 142 can be the same size or different size (larger, for example) than the main portion 146 or a lower portion 144.

The main portion 146 further includes a tab opening 148 that receives the cross bar 110 (FIG. 1). The tab opening 148 can be any size or shape to accommodate the cross bar 110. It is the top portion of the tab opening 148 that engages the cross bar 110 to quickly position the puller legs 150 along the cross bar 110 and to keep the puller legs 150 from further movement once the position is set. In an alternative embodiment, the bottom portion of the tab opening 148 engages the cross bar 110. In still another embodiment, the bottom portion and the top portion engages the cross bar 110. The lower portion 144 is coupled to the puller legs 150 at a second point or at a second pin 149. The lower portion 144 is also angled relative to the main portion 146 and can be designed to be flush with the puller legs. In another embodiment, the lower portion can have the same angle or different angle from the main portion 146 and thumb tab portion 142 as desired by the user.

In operation, the quick release mechanism 140 is easy to use to position the puller legs 150 anywhere along the cross bar 110. A user can use his thumb or any other finger to push in the thumb tab 142 towards the puller legs 150, thus releasing the top portion of the tab opening 148 away from the cross bar 110. Once the desired position on the cross bar 110 is reached at a particular notch 112, for example, then the user can release the thumb tab and the top portion of the tab opening can reengage the top portion of the cross bar with the assistance of the spring 141. Once positioned, the puller legs 150 will stay in place until the quick release mechanism 140 is utilized again.

The main components of the puller tool 100 can be made of various materials including forged metals, steel, aluminum, and other similar material. The materials used should be strong enough to withstand various forces that are exerted on the puller tool 100 during use.

Figure 3:
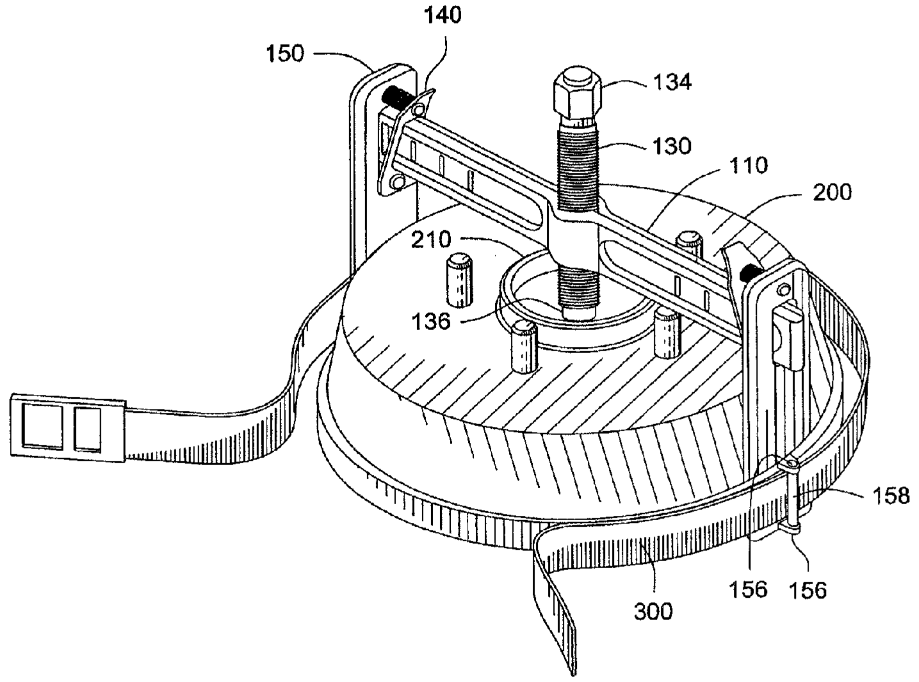
FIG. 3 illustrates the puller in use with a brake drum according to an embodiment of the invention.

FIG. 3 illustrates the puller 100 in use with a brake drum 200 according to an embodiment of the invention. The puller 100 is engaged with the vehicle component that is being serviced, such as the brake drum 200. The brake drum 200 is installed on a tire hub 210 and needs to be removed in order to be serviced. However, the brake drum 200 may be stuck on the tire hub 210 due to grime, and other contaminants and needs the puller 100 in order to be removed from the tire hub 210.

In this view, the puller 100 and its components are coupled to the brake drum 200. The forcing screw's 130 engagement end 136 is engaged with the tire hub 210 by rotating the forcing screw 130 in a first direction with the rotational tool (not shown and previously described). With the engagement end 136 engaged with the tire hub 210, the puller 100 has leverage to pull on the brake drum 200 when the forcing screw 130 is rotated in a desired direction. Also shown are the pulling legs 150 with the hooked feet 154 being engaged with brake drum 200 after being positioned by the quick release mechanism 140.

Also shown is a strap 300 received around a bottom portion of the puller legs. In one embodiment, the strap 300 may be secured to the puller legs with a holder 158 that is received by the retaining tab 156. The strap 300 can help to ensure that the puller legs 150 are properly attached to the brake drum 200. However, the strap 300 is not required to be used with the puller tool 100.

By rotating the forcing screw 130 again in the first direction, the cross bar will move towards the rotational end 134 of the forcing screw and thus moving the puller legs 150 and the brake drum with it. This will allow the brake drum 200 to be removed from the tire hub 210 and serviced. In order to remove the puller 100, the forcing screw 130 can be moved in the second direction.

Although the components described herein are vehicle components, the puller tool can be used to move any component that is coupled to another component. For example, an impeller from a shaft. The puller tool provides a quick and secure way to attach itself to the component being serviced and provides a mechanic an alternative to using a hammer to remove the component being serviced from another component.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

The invention claimed is:

1. A method of removing a component with a puller tool, comprising:

positioning a pair of puller legs along a cross bar of the puller tool with a quick release mechanism so that the pair of puller legs are coupled to the component being serviced;

attaching a strap around the pair of puller legs to secure the pair of puller legs to the component being serviced;

turning a screw in a first direction with a rotational tool until it contacts the component being serviced; and turning the screw in the first direction to move the component being serviced.

2. The method of claim 1 further comprising:

rotating the screw in a second direction to disengage the puller tool from the component being serviced.

3. The method of claim 1, wherein the positioning step further includes pushing on a tab of the quick release mechanism to disengage the quick release mechanism from the cross bar and then releasing the tab to engage the quick release mechanism with cross bar.

4. The method of claim 1, wherein the component is moved by uncoupling the component from another component.

5. The method of claim 1, wherein the positioning step further includes aligning the quick release mechanism with a notch on the cross bar so that the puller legs are equidistant from each other.

6. The method of claim 1, wherein the quick release mechanism is actuated by flexing a tab portion, moving the pair of puller legs to a respective desired location, and releasing the tab portion.

7. The method of claim 6, wherein flexing the tab portion results in compressing a spring.

8. The method of claim 7, wherein the spring is a coil spring.

9. The method of claim 1 further comprising:

engaging the quick releasing mechanism with the crossbar through a biasing force of a spring.

10. The method of claim 9 further comprising:

disengaging the quick release mechanism from the cross bar through compression of the spring.

* * * * *